United States Patent [19]
Callaway, Sr. et al.

[11] Patent Number: 5,038,853
[45] Date of Patent: Aug. 13, 1991

[54] HEAT EXCHANGE ASSEMBLY

[76] Inventors: James K. Callaway, Sr.; James K. Callaway, Jr.; Danny W. Callaway, all of 3607 Colson Rd., College Station, Tex. 77803

[21] Appl. No.: 297,758
[22] Filed: Jan. 17, 1989
[51] Int. Cl.$^5$ .................. F28F 7/00; H02K 9/00; H02K 9/02; F04B 17/00
[52] U.S. Cl. ................... 165/46; 165/47; 165/86; 165/169; 165/905; 417/366; 417/370; 310/54; 310/64; 4/544; 4/545
[58] Field of Search ............ 165/47, 90, 169, 46, 165/86, 905; 4/538, 541, 542, 543, 544, 545; 417/366, 370; 310/54, 64

[56] References Cited

U.S. PATENT DOCUMENTS

| | | | |
|---|---|---|---|
| 2,520,880 | 8/1950 | Harlamoff | 103/87 |
| 2,763,214 | 9/1956 | White | 103/87 |
| 2,784,672 | 3/1957 | Wallace | 103/87 |
| 2,862,120 | 11/1958 | Onsrud | 165/47 |
| 3,010,401 | 11/1961 | Granqvist | 103/25 |
| 3,060,335 | 10/1962 | Greenwald | 310/54 |
| 3,088,042 | 4/1963 | Robinson | 310/54 |
| 3,106,334 | 10/1963 | Fogleman et al. | 230/17 |
| 3,117,526 | 1/1964 | Zimmerman | 103/87 |
| 3,127,530 | 3/1964 | White | 165/46 |
| 3,188,833 | 6/1965 | Robinson | 62/505 |
| 3,969,043 | 7/1976 | Bright et al. | 417/366 |
| 4,087,708 | 5/1978 | Laing | 310/64 |
| 4,164,660 | 8/1979 | Palazetti | 290/2 |
| 4,198,191 | 4/1980 | Pierce | 417/369 |
| 4,213,498 | 7/1980 | Vandenbossche | 165/169 |
| 4,245,488 | 1/1981 | Alley | 68/12 R |
| 4,516,044 | 5/1985 | Bone | 310/64 |
| 4,700,092 | 10/1987 | Bincoletto | 310/54 |
| 4,854,373 | 8/1989 | Williams | 165/169 |
| 4,858,254 | 8/1989 | Popovich et al. | 4/544 |

FOREIGN PATENT DOCUMENTS 0065679  12/1982  European Pat. Off. ............ 165/905

Primary Examiner—John K. Ford
Attorney, Agent, or Firm—Kenneth A. Roddy

[57] ABSTRACT

A heat exchange assembly for use in combination with motor driven fluid pumps and the like, such as a motor, is provided. The assembly comprises a suction manifold, a discharge/diverter manifold, and a heat exchange jacket. The heat exchange jacket is maintained in close contact with the exterior surface of the motor, so that waste heat is transferred to the jacket thereby heating the fluid therein.

8 Claims, 3 Drawing Sheets

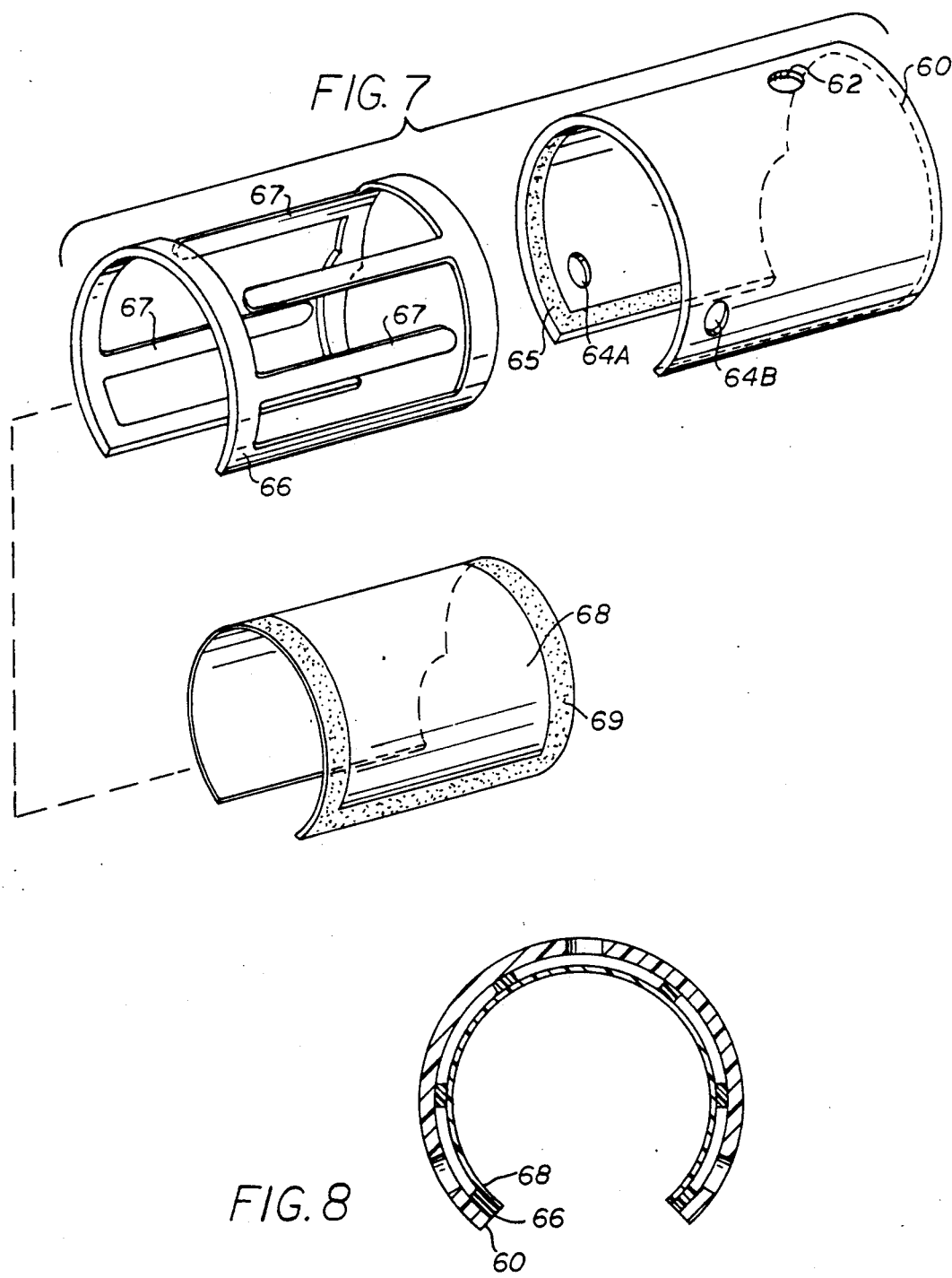

HEAT EXCHANGE ASSEMBLY

FIELD OF INVENTION

The present invention relates to an apparatus for heating a fluid using the heat produced by a motor. More particularly, this invention pertains to a heat exchange assembly used in combination with motor driven fluid pumps and the like.

BACKGROUND OF THE INVENTION

The use of an electric motor to drive a fluid pump is well known. For example, such motor/pump combinations are often used to circulate the water in a swimming pool or to supply pressure for the water jets in a hot-tub or spa. Electric motors produce heat during operation roughly in proportion to the horsepower rating of the motor. This heat energy is typically dissipated by the motor casing or other cooling means and wasted.

Various methods of cooling electric motors, including the use of liquid filled heat exchangers, are known. However, these systems typically require external means for circulating the cooling fluid through the heat exchanger, e.g. a coolant pump, and for cooling the fluid after it exits the heat exchanger. Also, the cooling fluid is typically not the same fluid as that being moved by the main pump.

It is often desirable to heat the particular fluid being pumped to maintain a relatively high fluid temperature in the particular system. Heating the water in spas and swimming pools, for example, is usually accomplished using heaters made especially for that purpose. Such heaters are typically expensive both to purchase and to operate.

It would, therefore, be desirable to provide a simple and inexpensive device for recovering the heat energy generated by an electric pump motor thereby warming the fluid being pumped.

SUMMARY OF THE INVENTION

In accordance with the present invention, heat generated by an electric motor is recovered and transferred to the fluid being pumped. Recovery of the heat is accomplished by a novel heat exchange assembly including a heat exchange jacket that fits securely around and in close contact with the exterior surface of the motor. Heat is transferred from the motor's casing to the heat exchange jacket thereby warming the fluid flowing within the jacket. The various embodiments of the invention include novel means for diverting fluid from the main flow system into the heat exchanger and back into the main flow system.

The heat exchange assembly of the present invention may be constructed of various materials. Preferred materials are poly-vinyl-chloride (PVC) or stainless steel. The only functional requirement of the material is that it be capable of thermodynamically transferring heat to a fluid being pumped. When constructed of PVC materials, the heat exchange assembly may be safely and easily installed by a layman on an existing motor/pump system. Ease of installation is achieved by taking advantage of the flexibility of PVC. A heat exchange jacket having a substantially semi-cylindrical shape and inside diameter equal to or slightly less than the outside diameter of the cylindrical exterior surface of the motor fits over the motor and in close contact with the exterior surface of the motor in a secure fashion without the necessity of other fastening means.

When constructed of a material such as stainless steel, the heat exchanger conducts heat more efficiently than if constructed using PVC, but installation is more difficult.

The heat exchange assembly of the present invention is completely self contained so that no liquid contacts any part of the electric motor. A heat exchange formed of PVC makes for a system that is safe to operate in close proximity to an electrical motor because of its electrical non-conductive properties. Although the heat exchange is described herein as being installed on eletric motors, it may also be installed on other heat generating motors, pumps, and the like.

Thus, the present invention provides an efficient and effective use of otherwise wasted heat generated by an electric motor.

In its broadest form this invention includes fluid inlet means, a heat exchange jacket, fluid outlet means and flow control means. The combination of elements makes up the heat exchange assembly of this invention. The various components of the invention can be configured and sized to provide desired flow and thermodynamic characteristics to the fluid being pumped.

There has been a long felt need for reliable, simple serviceable heat exchange assemblies. As hot tubs and spas become more commerically popular the efficient use of the inherent heat created by the drive mechanism has become more pronounced. However, since most spas and hot tubs are "built-in" to a deck or other housing it is virtually impossible to service the heating units (generally the first thing to wear out) without disassembling an entire spa apparatus. With the unique and novel design and functional characteristics of the heat exchange assembly of this invention the deficiencies of prior art devices are overcome.

BRIEF DESCRIPTION OF THE DRAWINGS

FIG. 7 is an exploded isometric view of the inner wall, baffle, and outer wall of the heat exchange jacket in an un-assembled condition.

FIG. 8 shows an end view of the heat exchange jacket.

DETAILED DESCRIPTION OF THE PREFERRED EMBODIMENTS

Figure 1:
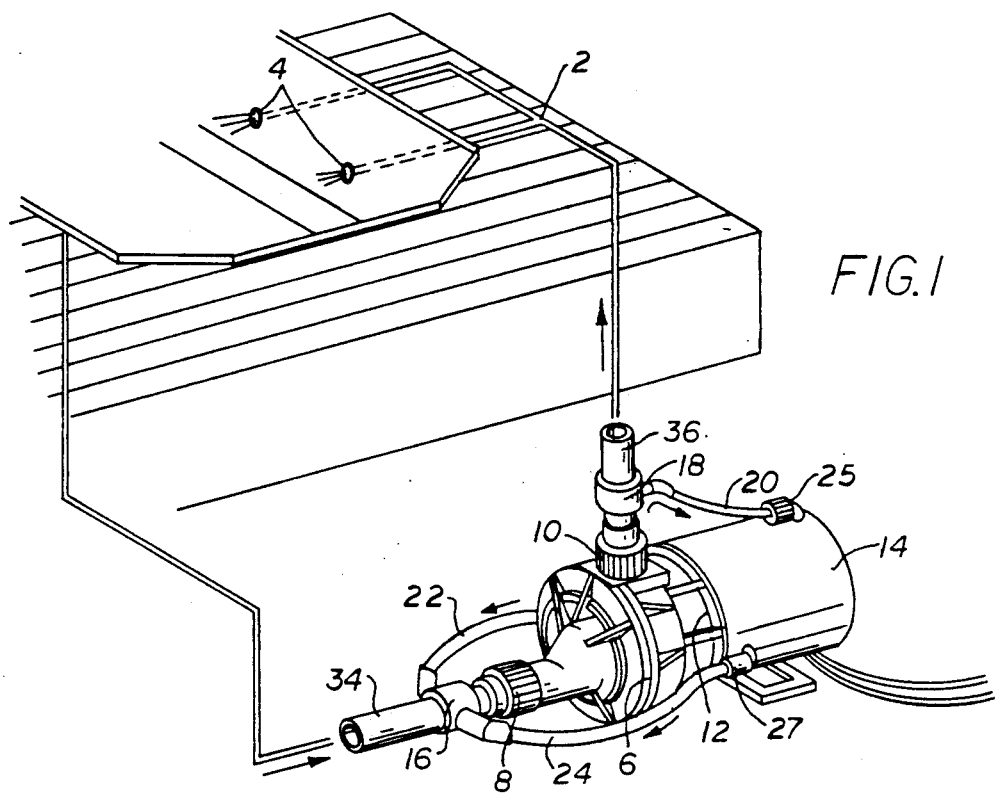
FIG. 1 shows a spa with water jets, and an electric motor and pump with a first embodiment of the heat exchange assembly attached.

By way of example, and without in any way intending to limit the scope of the invention, a preferred use of this invention is to heat the water in a jetted tub or spa as shown in FIG. 1. An electric motor/pump combination is commonly used to cause pressurized water to flow from the nozzles in a jetted tub. The heat exchanger apparatus of the present invention recovers the heat generated by the motor in such a system and thus provides a simple, inexpensive and safe means for heating the water. The materials used in the preferred embodiment are made from poly-vinyl-chloride (PVC) and are commercially available.

Figure 2:
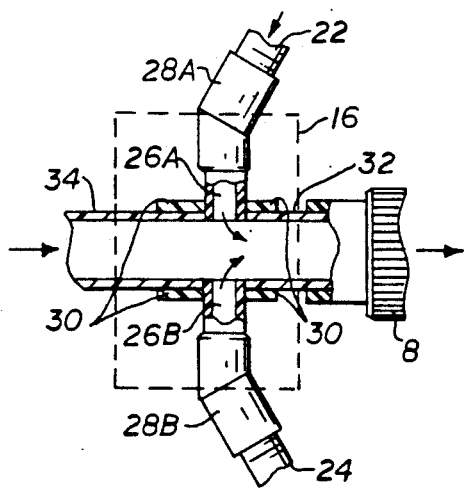
FIG. 2 is longitudinal cross section through a portion of the heat exchanger suction manifold attached to the pump intake port of the invention.
Figure 3:
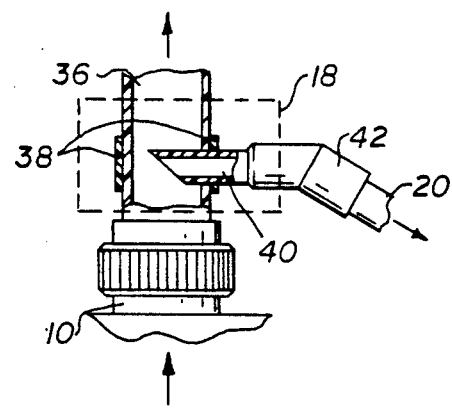
FIG. 3 is longitudinal cross section through a portion of the heat exchanger discharge/diverter manifold attached to the pump discharge port.

The fluid flow pattern in the first embodiment of the heat exchange assembly is shown by the arrows in FIGS. 1, 2 and 3. Referring to FIG. 1, a first embodiment of the present invention is shown in combination with a pump 6, an electric motor 12 and a jetted tub 2. Water is drawn from the tub reservoir 2 by the pump 6 through piping or conduit 34. Water enters the pump 6 through the pump's intake port 8, exits through the pump's discharge port 10, flows back to the tub through piping 36, and is expelled into the tub reservoir through water jet nozzles 4. A portion of the water exiting the pump's discharge port 10 is diverted toward the heat exchange jacket 14 by the discharge/diverter manifold 18.

The diverted water travels through the hose 20 and into the heat exchange jacket 14, flows through the jacket and absorbs heat from the motor. The water exits the jacket through hoses 22 and 24, enters the suction manifold 16, and reenters the pump's intake port.

Referring to FIG. 7, the components of the heat exchange jacket 14 are shown. The jacket comprises an inner membrane or wall 68, an outer membrane or wall 60, and a baffle 66. The inner wall 68 forms a semi-cylindrical cavity having substantially the same inside diameter as the outside diameter of the electric motor to which the jacket will be applied. More efficient conduction of heat from the exterior surface of the motor through the inner wall 68 may be achieved by using a relatively thin inner wall. The outer membrane 60 is substantially thicker than the inner wall 68 and is provided with an inlet port 62 and outlet ports 64a and 64b. These ports are fitted with 90 degree elbows 25, 27a and 27b (see FIG. 6) which are coupled to hoses 20, 22 and 24. A baffle 66 is located between the inner and outer membranes.

The baffle 66 serves two functions. First it serves as a spacer between the inner and outer walls thus providing a hollow cavity within the jacket. The baffle also serves as a flow path means for directing the flow of water within the jacket. As seen in FIG. 7, the baffle 66 is a semi-cylindrical generally open member having curved ends connected by longitudinal bottom portions with circumferentially spaced baffle plates 67 extending generally axially in alternating opposed relation from the ends defining a fluid flow path to cause the water entering the jacket at inlet 62 to take an indirect and turbulent route to the outlets 64a, 64b. Due to the circuitous path the water must take within the jacket, more efficient heating of the water is realized.

Referring to FIG. 8, an end view of the heat exchange jacket is shown. The jacket is assembled by applying glue to the upper surface of the inner wall 68 along the edges 69 and fitting the baffle 66 over the inner wall. Glue is then applied along the lower surface of the outer wall 60 along edges 65. The outer wall 60 is then attached to the baffle 66 by fitting the outer wall 60 over the baffle 66.

Figure 6:
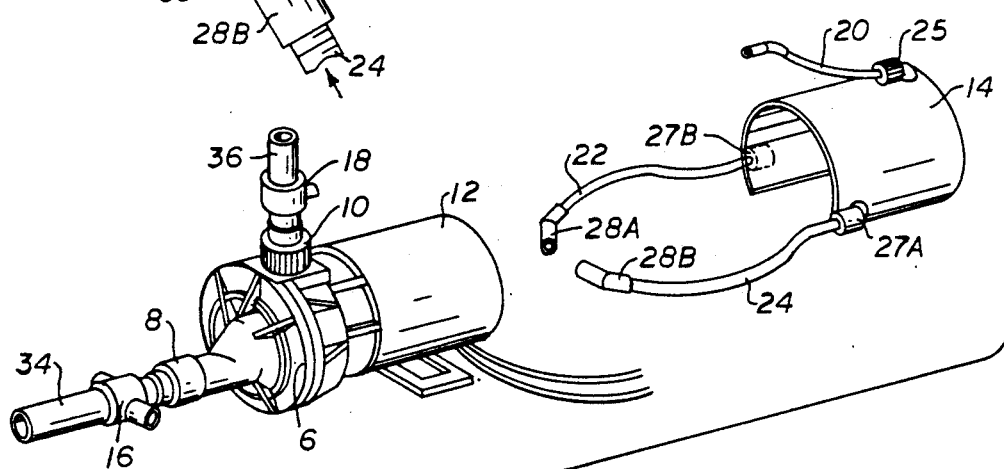
FIG. 6 is an illustration of the heat exchange assembly of FIG. 1 removed from the electric motor and pump.

FIG. 6 shows the assembled heat exchange jacket 14 ready for sliding onto the motor 12. According to the practice of this preferred embodiment, the jacket 14 is held tightly in place in contact with the exterior surface of the motor 12 by the elastic pressure or resiliency of the PVC materials.

Referring now to FIG. 3, fluid inlet means in the form of a discharge/diverter manifold 18 is shown coupled to the pump discharge port 10. A diverter nipple 40 having a tip cut at approximately a 45 degree angle is inserted into the manifold with the hypotenuse of the cut facing the flow of water. As water flows past the nipple 40 a portion of the flow is diverted into the nipple 40 and hence into the heat exchange jacket 14 via elbow 42 and hose 20.

Referring to FIG. 2, fluid outlet means in the form of a suction manifold 16 is shown coupled to the pump intake port 8. Fluid flows out from the heat exchange jacket 14 through hoses 22 and 24, connectors 28a and 28b, nipples 26a and 26b, and enters the suction manifold 16. This flow is due to the negative pressure at the pump intake port 8. Furthermore, the negative pressure within the suction manifold 16 has a beneficial influence on the efficiency of the discharge/diverter manifold 18. This influence is based on a somewhat negative pressure (relative to the pressure at the pump discharge port 10) within the entire heat exchange assembly including the diverter nipple 40. Thus, the low pressure within the suction manifold 16 is also experienced, to some degree, at the opening of nipple 40 within the discharge/diverter manifold 18. Due to this pressure differential the 45 degree angle at the tip of nipple 40 is not critical to the functioning of this embodiment but merely enhances the flow of water into the heat exchange jacket.

Figure 4:
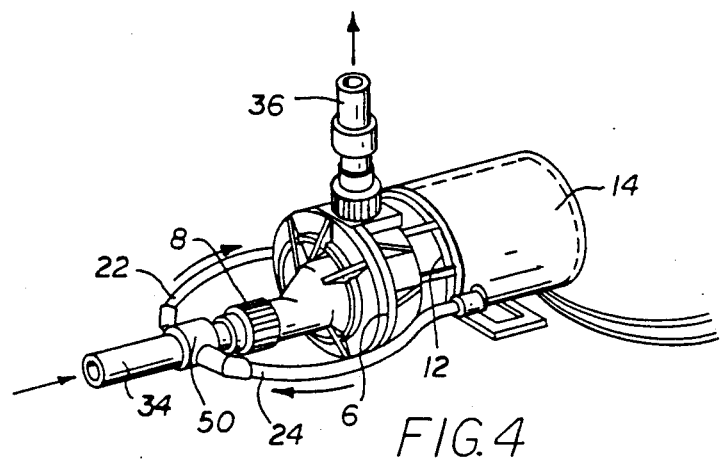
FIG. 4 is an illustration of the heat exchange assembly having a modified suction/diverter manifold attached.
Figure 5:
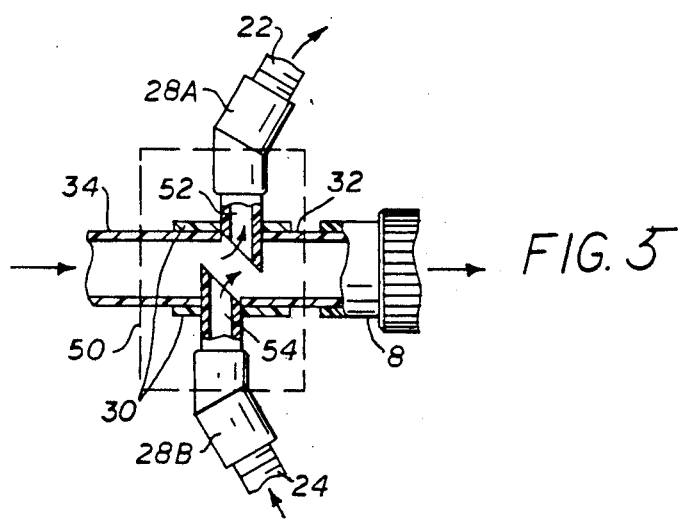
FIG. 5 is a longitudinal cross section through a portion of the modified suction/diverter manifold of FIG. 4.

Alternatively, fluid transfer between the pump and jacket may be accomplised by the use of a suction/diverter manifold 50 connected to the pump intake port 8 as shown in FIGS. 4 and 5. manifold 50 as shown in FIGS. 4 and 5. The fluid flow pattern of this embodiment is shown by the arrows in FIGS. 4 and 5. Fluid flows toward the pump intake 8 through intake piping 34 and through a suction/diverter manifold 50. Diverter nipples 52 and 54 are inserted through and normal to the wall of the diverter manifold 50 in laterally opposed and longitudinally offset relation. The inserted end of each nipple 52 and 54 is cut at approximately a 45 degree angle. The face of the 45 degree cut of nipple 52 is situated so as to face the flow of water moving toward the pump intake port 8 and the face of the 45 degree cut of nipple 54 is situated in the opposite direction. Thus, a portion of the water flowing through the diverter manifold 50 is diverted by nipple 52 and caused to flow into the heat exchange jacket through the flexible PVC hose 22.

The flow of fluid into the heat exchange jacket through nipple 52 causes a relatively positive fluid pressure within the jacket. Also, fluid flowing past nipple 54 toward the pump intake 8 creates a venturi effect near the opening of nipple 54 which acts in conjunction with the negative pressure at the downstream side of nipple 54 to create a relatively negative pressure within nipple 54. The relatively positive pressure in nipple 52 acts in concert with the relatively negative pressure in nipple 54 to cause the water to circulate through the heat exchange jacket.

From the foregoing description considered in connection with the accompanying drawings, it will be apparent to those of ordinary skill in the art that while the heat exchange assembly of this invention has been illustrated in the context of a jetted tub water circulation system, it is clearly not limited to such application, but may be equally useful in many other systems utilizing a fluid pump driven by a motor. Furthermore, while the use of components made from polyvinyl-chloride has been suggested, it will be readily apparent to those skilled in the art that other materials such as stainless steel or other metals may also be used to construct the heat exchange assembly. Other modifications and changes to the present invention will likely become apparent to those skilled in the art. It is, therefore, to be understood that the appended claims are intended to cover all such modifications and changes as fall within the true spirit and scope of the invention.

We claim:

1. A heat exchanger for use in combination with motor driven fluid pumps, said heat exchanger comprising:
   a heat exchange jacket including a hollow enclosed cavity for maintaining heat exchange contact between said pump motor and a fluid within said cavity, said jacket configured to closely conform to and engage the exterior surface of said pump motor;
   fluid inlet means including a discharge/diverter manifold operatively connected to the pump discharge port and to said jacket to divert a portion of the fluid discharged by the pump into said cavity;
   fluid outlet means including a suction manifold having a section of conduit connected to the pump intake port and a pair of tubular extensions each having one end within said conduit in contact with the fluid flowing therethrough and their opposite ends connected in fluid communication to said jacket cavity to draw fluid from said cavity by negative pressure at the pump intake port and recirculate it through the pump; and
   flow path means within said cavity for directing the flow of fluids within said cavity through a circuitous path from said fluid inlet means to said fluid outlet means.

2. The heat exchanger of claim 1 wherein said hollow enclosed cavity is defined by an inner wall and an outer wall spaced outwardly therefrom and joined together along their edges.

3. The heat exchanger of claim 2 wherein said inner wall and said outer wall are spaced apart and joined together along their edges by said flow path means.

4. The heat exchanger of claim 1 wherein said heat exchange jacket is made from a plastic material curved to resiliently engage the exterior surface of said pump motor.

5. The heat exchanger of claim 1 wherein
   said heat exchange jacket is made from a metallic material curved to engage the exterior surface of said pump motor.

6. The heat exchanger of claim 3 wherein said flow path means comprises a baffle member secured between said inner wall and said outer wall joining them together along their side edges and having a plurality of baffle plates between said inner wall and said outer wall defining a circuitous path within said cavity from said fluid inlet means to said fluid outlet means.

7. The heat exchanger of claim 6 wherein said baffle plates comprise a series of circumferentially spaced longitudinal plates extending generally axially to form a fluid flow path within said cavity connecting said inlet means and said outlet means.

8. The heat exchanger of claim 1 wherein said discharge/diverter manifold comprises a section of conduit connected to the pump discharge port and a tubular extension having one angular end within said conduit in contact with the fluid flowing therethrough and its opposite end connected in fluid communication to said jacket cavity.

* * * * *